H. B. CARTER.
REEL CRADLE.
APPLICATION FILED JAN. 11, 1910.
970,884.
Patented Sept. 20, 1910.
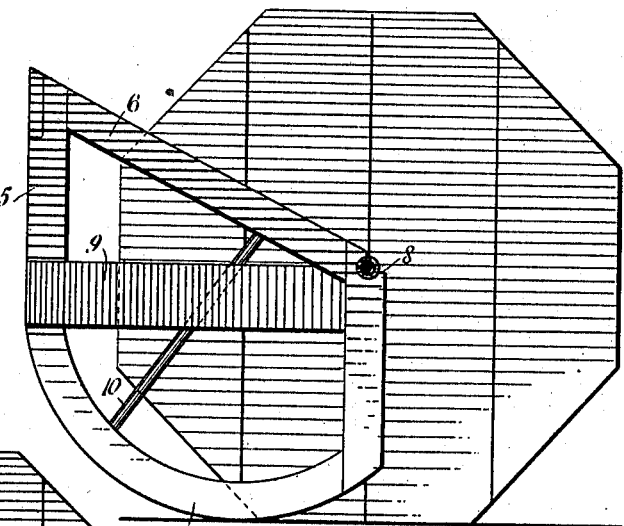
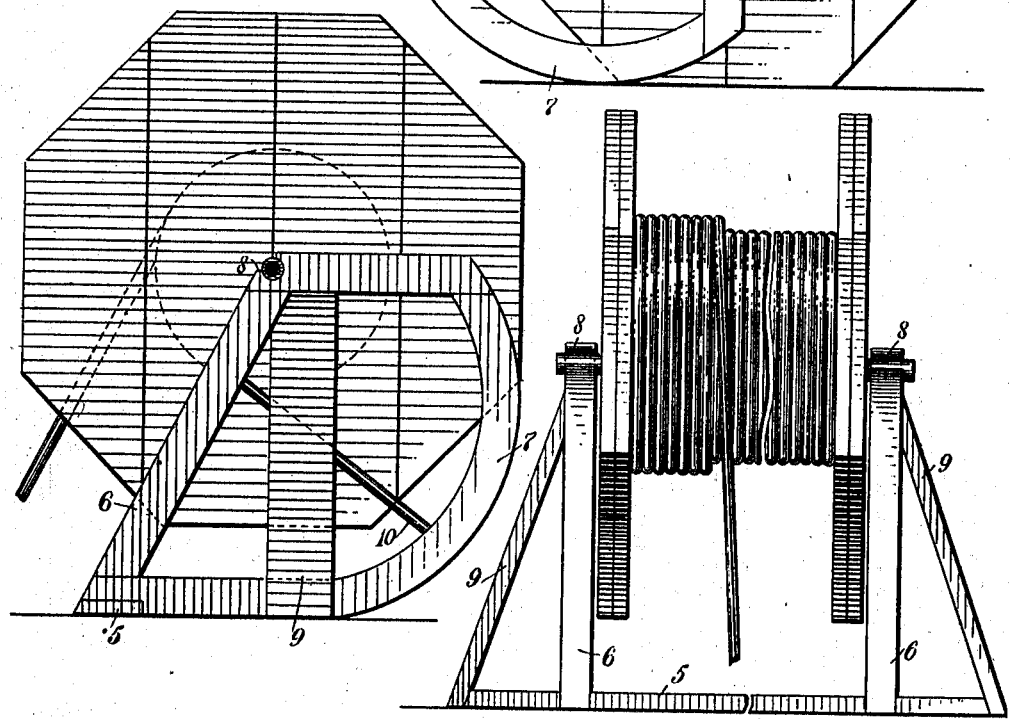
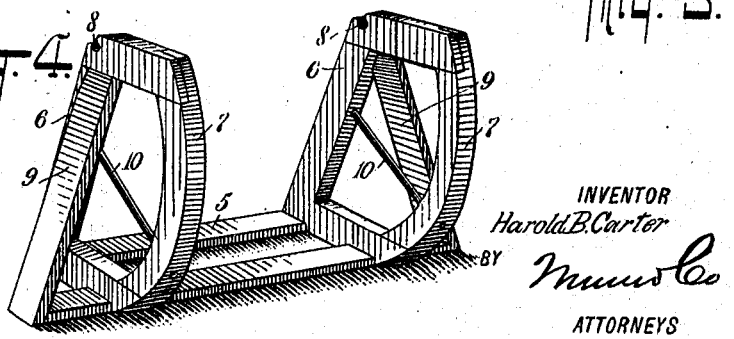
WITNESSES:
INVENTOR
Harold B. Carter
BY
ATTORNEYS

UNITED STATES PATENT OFFICE.

HAROLD BOOTHBY CARTER, OF SPRINGFIELD, VERMONT.

REEL-CRADLE.

970,884.

Specification of Letters Patent. Patented Sept. 20, 1910.

Application filed January 11, 1910. Serial No. 537,409.

*To all whom it may concern:*

Be it known that I, HAROLD B. CARTER, a citizen of the United States, and a resident of Springfield, in the county of Windsor and State of Vermont, have invented a new and Improved Reel-Cradle, of which the following is a full, clear, and exact description.

The invention has in view a cradle for a reel on which wire cable, flexible pipe, etc. are wound, constructed to engage the journals of the reel when the reel is resting on the ground or other surface and rocked to a stable position, in which the reel is raised so as to be freely rotatable on the cradle as a support, the raising of the reel in this manner requiring little exertion for reels of considerable weight.

Reference is to be had to the accompanying drawings forming a part of this specification, in which similar characters of reference indicate corresponding parts in all the views.

Figure 1 is a side view of a reel cradle constructed in accordance with my invention, the cradle being shown in its lowest position in engagement with the reel preparatory to elevating the reel above the ground; Fig. 2 is a similar view of the cradle in its stable position, with the reel raised; Fig. 3 is a front elevation of the cradle and reel when they are in the position shown in Fig. 2; and Fig. 4 is a perspective view of the cradle in its stable position, with the reel removed.

The cradle comprises a base 5, on which it stably seats, having reel supports 6 spaced apart and rigidly secured thereto, each reel support having a rocker 7 at its outer side and a bearing 8 at the top adjacent to the opposite side, the bearing opening forwardly and upwardly and being arranged at a greater distance from the base 5 than from the upper portions of the rockers 7, so that when the cradle is turned over on the rockers, the journals of the reel or spool may be engaged while the reel is resting on the ground or other surface which supports the cradle, the rockers being eccentrically arranged with respect to the bearings.

The base 5 is preferably composed of boards spaced apart, with the boards at the rear side adjacent to the rockers extended a substantial distance to the outer side thereof, where the extended portions serve to attach the ends of downwardly and outwardly-inclined braces 9 connected to the upper portions of the reel supports and serving to hold the same rigidly upright and resist the side lash of the reel. The base-boards 5 are preferably let into the reel supports 6 to further insure the rigidity of the structure. If the reel supports are of skeleton construction, as shown, they are preferably braced by braces 10 extending between the rockers and the struts at the opposite sides.

In the use of the cradle, in raising the reel so that the wire cable, lead pipe or other flexible material can be unwound, the cradle is turned over on the rockers, as shown in Fig. 1, and the trunnions of the reel engaged in the bearings 8, the trunnions of the reel or spool ordinarily being provided by passing therethrough a piece of pipe or pinch-bar. With the cradle thus engaged it is rocked upright by depressing the front of the base, in this way permitting of a relatively heavy reel being easily raised to a position where it is freely revolved.

Having thus described my invention, I claim as new and desire to secure by Letters Patent:

1. A reel cradle having a base on which it is adapted to stably seat, and reel supports spaced apart and attached to the base, having rockers arranged at one side thereof and extending from the base, the reel supports provided with bearings for engaging the journals of the reel, arranged adjacent to the opposite sides of the supports, with the bearings located at a greater distance from the base than from the rockers.

2. A reel cradle comprising reel supports spaced apart and connected together, each support having a seating portion and a rocking portion, and bearings carried by the supports for the journals of the reel, arranged relatively closer to the rocking portion of the supports than to the seating portions thereof.

3. A reel cradle comprising reel supports arranged side by side and spaced apart, each support having a seating portion and a rocking portion, with the rocking portion substantially continuous with the seating portion, and bearings carried by the supports for the journals of the reel, arranged to permit of the reel seating on the surface on which the cradle is supported when the cradle is standing on the rocking portions of the supports, and to support the reel above the surface on which the cradle is supported when the cradle is standing on the seating portions of the support.

4. A reel cradle having a base, reel supports spaced apart and secured to the base, each support having a rocker at one side thereof forming a continuation of the base and provided with a bearing arranged adjacent to the opposite side relatively closer to the rocker than the base, and braces arranged between the reel supports and the base at the outer sides of said supports.

In testimony whereof I have signed my name to this specification in the presence of two subscribing witnesses.

HAROLD BOOTHBY CARTER.

Witnesses:
  FRANK E. POMROY,
  MABEL E. DAVIS.